Jan. 7, 1969 G. MARTIN 3,421,018

AND TYPE FAIL-SAFE LOGIC CIRCUIT

Filed Jan. 5, 1965 Sheet 1 of 3

INVENTOR
GÉRARD MARTIN
BY
Bacon & Thomas
ATTORNEYS

INVENTOR
GÉRARD MARTIN
BY
Bacon & Thomas
ATTORNEYS

INVENTOR
GÉRARD MARTIN
BY Bacon & Thomas
ATTORNEYS

United States Patent Office 3,421,018

Patented Jan. 7, 1969

3,421,018

AND TYPE FAIL-SAFE LOGIC CIRCUIT

Gérard Martin, Villemomble, France, assignor to Compagnie des Freins et Signaux Westinghouse, Paris, France

Filed Jan. 5, 1965, Ser. No. 423,521
Claims priority, application France, Jan. 8, 1964, 959,624; Feb. 12, 1964, 963,433
U.S. Cl. 307—218 5 Claims

ABSTRACT OF THE DISCLOSURE

Fail-safe AND gate, comprising a first transistor connected across a direct current source and having an output circuit. At least two control circuits each of which is connected to the control electrode of the first transistor by a separate resistor and each of which includes a second transistor connected across a direct current source and having its control electrode connected to an individual source of recurrent alternating signals independent of the output of the output circuit, and one or each control circuit also comprising a capacitor having one of its plates connected to the output electrode of the associated second transistor and its other plate connected to the control electrode of the first transistor through the associated resistor, and a rectifier device connected between the electrode of the second transistor connected to a reference potential and the junction between the capacitor and the resistor.

Safety conditions in industrial installations in general, and in railway traffic control in particular, require that information medium shall be more and more reliable. It is important that in the case of a failure of any one of the components of a functional unit, the output is or becomes such that the transferred information is the most restrictive, that is to say, always in the sense of the safety required for the given installation.

In the particular semi-conductor circuits, prior AND type semi-conductor gates are logical circuits used for example in the logical treatment of information, and have the disadvantage that in the event of short circuit or accidental breakdown of a component, for example a transistor, the output information give rise to a signal which cannot be distinguished from that produced by the conductive and non-conductive states of the transistor in question, states governed under normal operation by the input signal applied to the circuit.

In order that the present invention may be more clearly understood, reference is made to the accompanying drawings, in which.

Figure 1:
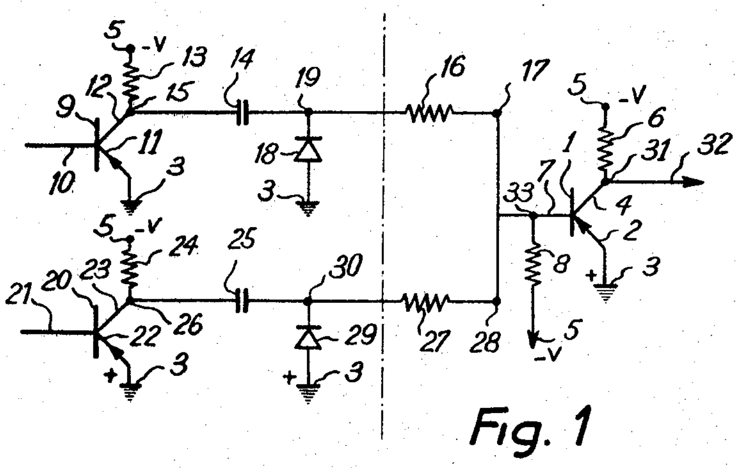
FIGURE 1 represents the electric circuit diagram of a practical example of a logical AND type circuit according to the invention.

As is shown in FIGURE 1 the logical circuit comprises a transistor 1 of the PNP type of which the emitter 2 is connected to the positive terminal of a direct current source, not shown in the drawing, the said terminal being grounded at 3.

The collector 4 of the transistor 1 is connected to the negative terminal 5 of the source of direct current through a resistance 6; the base 7 of the transistor 1 is connected to the negative terminal 5 of the said source through a resistance 8.

In the example under consideration the logical AND circuit comprises two control circuits which produce signals of rectangular form and defined amplitude as is explained later.

One of the circuits is constituted by a transistor 9 of the PNP type, of which one input signal passes through the base of the logical circuit passing through the base 10 of the transistor 9.

The emitter 11 of this transistor is connected to earth at 3. The collector 12 is connected to the negative terminal 5 of the said source, through a resistance 13.

A condenser 14 is connected to the terminal 15 of the collector 12 and is connected in series with a resistance 16 the free terminal 17 of which is connected to the base 7 of the transistor 1.

A diode 18 is connected between earth 3 and the terminal 19 common to the condenser 14 and to the resistance 16.

The diode 18 is connected so as to allow the passage of current in the direction, earth 3–terminal 19.

The second control circuit of the logical AND circuit, the same as the first, is constituted by a transistor of the PNP type, by the second input signal of the logical circuit passing through the base 20.

The emitter 22 of the transistor 20 is grounded at 3, the collector 23 is connected to the negative terminal 5 of the source through a resistance 24.

A condenser 25 is connected to the terminal 26 of the collector 23 and is connected in series with a resistance 27 the free terminal 28 of which is also connected to the base 7 of the transistor 1.

A diode 29 is connected between the ground at 3 and the terminal 30 common to the condenser 25 and to the resistance 27.

The diode 29 is connected so as to allow the passage of current in the direction, earth 3–terminal 30.

In the example under consideration, the transistors which are used are of the PNP type. The same logical AND circuit can be produced with the aid of transistors of the NPN type by changing over the positive and negative terminals of the D.C. source of current and also terminals of the diodes 18 and 29.

The output information of the logical AND circuit is taken from the terminal 31 of the collector 4 and is transmitted by the output conductor 32.

Figure 2:
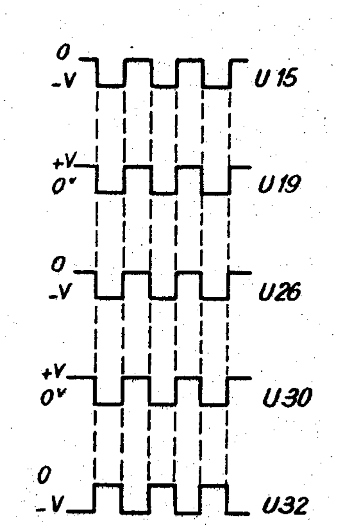
FIGURE 2 shows the relationship of the voltage curves at different points in the circuit represented in FIGURE 1 when the input signals are the same.

According to one way of using the logical circuit according to the invention the two input signals have respectively the relationships of the curves of the voltage U15, taken from the terminal 15 of the transistor 9 of the first control circuit, and of the voltage U26, taken from the terminal 26 of the transistor 20 of the second control circuit, as shown in FIGURE 2.

These input signals are rectangular shaped and their amplitude nearly equal to —V, V being the value of the voltage of the D.C. electric current source.

The signals taken from the terminals 19 and 30 have, after having traversed the capacitors 14 and 25, the form of the voltage curves U19 and U30, taken respectively from the terminals 19 and 30 as shown in FIGURE 2.

The shape of these signals is nearly the same as the form of the input signals previously defined, but their amplitude is equal to +V.

These elements of the control circuit are chosen so as to maintain the transistor 1 in a non-conductive state when the instantaneous voltage of the impulses of both the input signals is zero, and bottomed when the amplitudes of the impulses of at least one of the input signals is equal to its maximum value, that is to say here at —V.

The voltage curve U32 represented in FIGURE 2 shows the shape of the output signal transmitted by the output conductor 32.

In the example of use which has just been considered the width of the pulses of the two input signals are equal and the signals are strictly in phase as the voltage curves U15 and U26 show in FIGURE 2.

If the input signals are of the same frequency and composed of impulses of different widths, the impulses of the signal taken from the output of the logical circuit are such that the transistor 1 is non-conductive periodically during a time interval equal to the shortest duration of the pulses of the two input signals and more precisely a time interval equal to the recovery time of the pulses of the two input signals.

Figure 3:
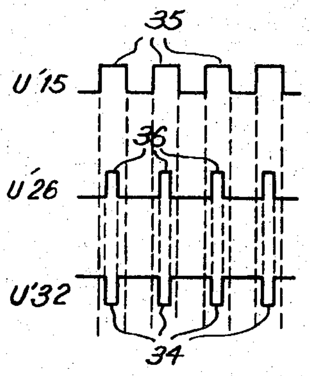
FIGURE 3 shows the relationship of the voltage curves at different points in the circuit represented in FIGURE 1 when the input signals are different.

Thus in the example of use of the logical circuit shown in FIGURE 3, the input signals have the relationship of the voltage curves U'15 and U'26.

The impulses 34 of the output signal the shape of which is shown by the voltage curve U'32 have a width equal to the overlap time of the impulses 35 and 36 respectively of the input signals U'15 and U'26.

To this end, the relationship between the different elements of the control circuits will be determined when the transistor 1 is in its non-conductive state or saturated state.

In the following description:

U19 is the value of the voltage at the terminal 19
U30 is the value of the voltage at the terminal 30
U7 is the value of the voltage at the base 7
R6 is the value of the resistance 6
R8 is the value of the resistance 8
R16 is the value of the resistance 16
R27 is the value of the resistance 27
J6 is the value of the current passing through the resistance 6 and, consequently, the collector 4
J8 is the value of the current passing through the resistance 8
J16 is the value of the current passing through the resistance 16
J27 is the value of the current passing through the resistance 27
K is the co-efficient of amplification of the transistor 1.

The translator 1 is in its non-conductive state when the value of the voltage on the base 7 of the transistor 1 is positive or zero, which can be translated by the following expression:

$$R8.J8-(R16.J16+R27.J27)\geqslant 0$$

The input signals passing through the bases 10 and 21 are of the same frequency, their amplitude being compatible with the obtaining of rectangular periodic signals of amplitude —V applicable to the inputs of the AND circuit and more precisely to the terminals 15 and 26 of the collectors of these transistors. The input signals taken up by these terminals are identical and are of the same amplitude as is shown in FIGURE 2.

The maximum values of the voltages U19 and U30 are obviously equal to the positive value +V of the voltage of the source of D.C. current.

The two control circuits being identical in the example under consideration, the resistances R16 and R27 are equal, as are the currents J16 and J27.

According to Kirchoff's law of nodes applied to the terminal 33 of the base 7, the current passing through the resistance 8 is equal to the sum of the currents passing through the resistances 16 and 27, ignoring the base-collector residual current when the transistor is in its non-conductive state.

Thus;

$$U19=U30=+V$$

$$J16=J27=\frac{J8}{2}$$

The preceding expression becomes:

$$R8{\cdot}J8-\frac{R16}{2}\times J8\geq 0$$

Thus the transistor 1 is in its non-conductive state when the value of the resistance R8 is greater than or at least equal to half the value of the resistance R16 or of the resistance R27, $$R8\geq\frac{R16}{2}\text{ or }\frac{R27}{2}$$

On the other hand, the current passing through the collector 4 is equal to the product of the current J7 passing through the base 7 times the coefficient of amplification K of the transistor.

In the example shown, this equality is expressed by:

$$J6=K\times J7$$

According to Kirchoff's law of nodes applied to the terminal 33 of the base 7 the current J7 passing through the base 7 of the transistor 1 is equal to the difference between the current 8 passing through the resistance J8 and between the sum of the currents J16 and J27 passing respectively through the resistances 16 and 27.

$$J7=J8-J16-J27$$

Keeping the same values for the different elements of the control circuits, this equation becomes:

$$J7=\frac{V}{R8}=\frac{U19}{R16}-\frac{U30}{R27}$$

ignoring the value of the emitter-base voltage which is very small as compared with the value of the voltages V or U19 or U30.

The elements of the control circuits are of such values that the transistor 1 is bottomed when either one of the voltages U19 or U30 is zero, i.e., when either of the input signals U'15 or U'26 has a voltage equal to —V.

If the value of the voltage U30 is zero, the current J7 passing through the base 7 of the transistor 1 when the latter is bottomed, can be expressed by the following equation:

$$J7=\frac{J6}{K}=\frac{V}{R8}-\frac{U19}{R16}=\frac{V}{R8}-\frac{V}{R16}=\frac{V}{KR6}$$

The saturation condition of the transistor 1 is expressed therefore by:

$$\frac{1}{K{\cdot}R6}\leq\frac{1}{R8}-\frac{1}{R16}$$

Thus the transistor 1 is in its non-conductive state when the resistances 16 and 27 of the control circuits and the polarization biasing 8 of the base of the transistor, satisfy satisfy the relationship:

$$R16\text{ or }R27\leqslant 2\times R8$$

The transistor 1 is bottomed when these resistances also the relationship:

$$\frac{1}{K{\cdot}R6}\leq\frac{1}{R8}-\frac{1}{R16}\text{ or }\frac{1}{R8}-\frac{1}{R27}$$

These relationships allow a suitable choice of values for the resistances R8, R16, R27 and of the value of the co-efficient of amplification K of the transistor 1 so as to obtain on the collector 4 of the transistor a signal the amplitude of which is zero when one of the voltages U19 or U30 has a zero value, i.e., when one of the voltages U'15 or U'26 has a value equal to —V and, consequently, when the two voltages U19 and U30 have a zero value the amplitude of the above signal having, on the contrary, a maximum value equal to —V, in this particular case when the values of the voltages U19 and U30 are both maximum, that is to say here equal to +V. In other words when the voltages U'15 and U'26 are both equal to zero.

The other elements of the control circuits and more particularly the transistors 9 and 20, resistances 13 and 24, condensers 14 and 25, diodes 18 and 29, are chosen so as to allow the obtaining on the terminals 19 and 30 of rectangular periodic signals having a maximum amplitude equal to +V.

If 0 is used to designate the binary state of the input signal occurring at the terminal 15 or at the terminal 26, when this signal has a zero value corresponding to the absence of oscillations and I the binary state of the input signal occurring at the terminal 15 or at the terminal 26 when this signal has a non-zero value corresponding to the presence of oscillations, the binary state occurring at the output 32 of the logical circuit is also 0, when at least one of these binary states of the input signals has a non-zero value, and is equal to I when the binary states of the input signals are both equal to I.

In the example which has just been described and illustrated only two control circuits have been considered. It is quite evident that the logical AND circuit can be used with any number whatever of control circuits which are connected to the base 7 of the transistor 1 in a similar manner to the two control circuits described above, and the elements of which satisfy the same relationship.

The arrangement which has just been described is used more particularly with input signals of the same frequency.

Figure 4:
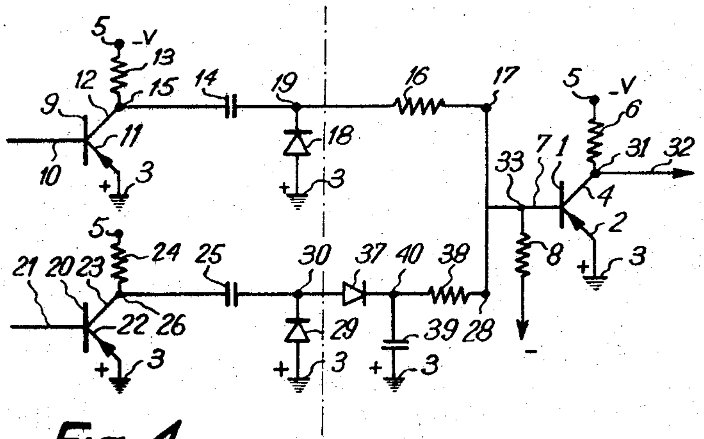
FIGURE 4 represents the circuit diagram of a second practical example of an AND type logical circuit according to the invention.

When the input signals are not of the same frequency, the logical circuit shown in FIGURE 4 can be provided in which an integrating device has been inserted in one of the control circuits.

The elements shown in FIGURE 4 having the same references as those elements shown in FIGURE 1 which serve the same functions and may be identical.

One of the control circuits comprises a diode 37 one of the terminals of which is connected to the terminal 30, the other terminal being connected to a resistance 38 connected to the terminal 28. A condenser 39 is connected between earth at 3 and the terminal 40 common to the diode 37 and the resistance 38.

The diode 37 is connected so as to allow the passage of current in the direction: Terminal 30–terminal 40.

The device, constituted by the diode 37, the resistor 38 and the condenser 39, forms an integrator for the signal occurring at the terminal 30.

Figure 5:
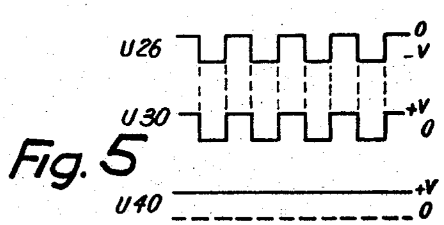
FIGURE 5 shows the relationship of the voltage curves at different points in the circuit represented in FIGURE 4.

As shown in FIGURE 5, the periodic input signal represented by the voltage curve U26 is transformed into a continuous signal represented by the voltage curve U40 occurring at the terminal 40 of the integrating device.

The control circuit comprising the integrating device, transforms the impulses of the input signal into a continuous control signal. This control signal is in the binary state 0 when the corresponding control circuit is not fed, and in the binary state I when the control circuit is fed by a recurring input signal.

According to the same process as that previously described, the output signal of the logical circuit is in the binary state 0 when the input signal of the first control circuit or when the signal transformed by the second control circuit is in the binary state 0.

The output signal of the logical circuit is in the state I when the input signal of the first control circuit and the signal transformed by the second control circuit are in the binary state I.

The following table sums-up the different faults which can affect the components of the logical circuits previously described and indicates the output signals produced by these faults.

| Element under | Short circuit | Interruption |
|---|---|---|
| Condenser 14 | Disappearance of voltage, U19=+V, U32=0. | Disappearance of voltage U19=+V, U32=0. |
| Condenser 25 | Disappearance of voltage U40=+V, U32=0. | Disappearance of voltage U40=+V, U32=0. |
| Condenser 39 | Disappearance of voltage U40=+V, U32=0. | The condenser 39 is not necessary if U19 and U30 are of the same phase and frequency, in the opposite case breakdown of 39 gives U32=0. |
| Diode 18 | U19=OV, U32=0 | Disapperance of voltage U19=+V, U32=0. |
| Diode 29 | U40=0, U32=0 | Disapperance of voltage U40=+V, U32=0. |
| Diode 37 | Input signal U26 is cancelled by the condenser 39 of high capacity. | Terminal 40 isolated U32=0. |
| Resistance 16 | Cannot be put in short circuit by its construction. | Impossible to cut-off transistor 1, U32=0. |
| Resistance 38 | do | Do. |
| Resistance 8 | The transistor 1 is permanently bottomed U32=0. This fault does not have to be considered if resistance 8 cannot be put in short circuit by its construction. | Impossible to bottom the transistor 1, U32=0. |
| Resistance 6 | Output 32 is permanently connected to the terminal 5 of the source U32=0. This fault does not have to be considered if the resistance 6 cannot be put in short circuit by its construction. | The output 32 is isolated U32=0. |
| Transistor 1 | U32=0 permanently | The output 32 is permanently connected to the terminal 5 of the source U32=0. |

Figure 6:
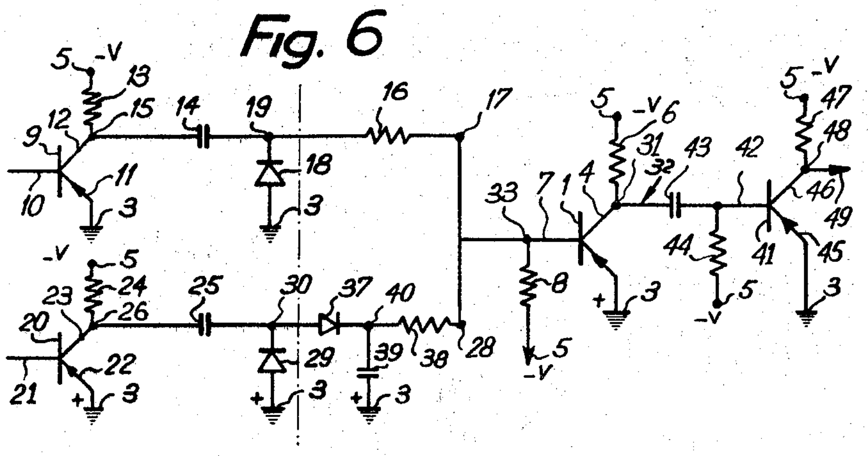
FIGURE 6 represents the electric circuit diagram of a third practical example of an AND type logical circuit according to the invention.

To obtain a more stable output signal having an increased constance taking into account the tolerances in the elements constituting the logical circuit and variations in the characteristics of the transistors as a function of the temperature, a logical circuit which has been described previously is completed by an amplification stage connected to the output 32 as shown in FIGURE 6.

The elements shown in FIGURE 6 and having those references which are shown in FIGURES 1 and 4 serve the same functions and can be identical.

The amplification stage comprises a transistor 41 of the PNP type of which the base 42 is connected to the terminal 31 of the collector 4 of the transistor 1 through a condenser 43.

The base 42 is also connected to the negative terminal 5 of the source of D.C. electric current through a resistance 44.

The emitter 45 of the transistor 41 is grounded at 3 although the collector 46 is grounded to the negative terminal 5 of the source through a resistance 47.

The output signal of the logical AND circuit amplifier stage together, is applied to the terminal 48 of the collector 46 and is transmitted by a conductor 49.

The output conductor 49 may be connected to another AND type logical circuit.

The signal occurring at the output 49 is similar to and nearly in phase with the signal appearing at the terminal 31 of the logical circuit itself.

The practical examples of logical circuits which have just been described employ input signals the impulses of which are nearly equal in amplitude and in value.

Figure 7:
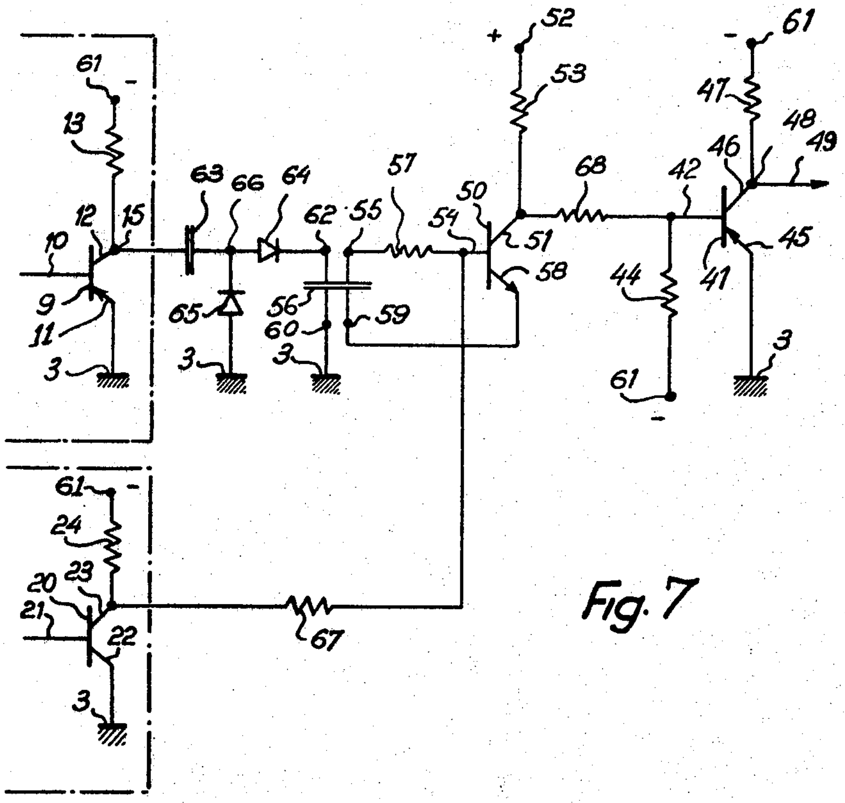
FIGURE 7 represents the electric circuit diagram of a fourth practical example of an AND type logical circuit according to the invention.

On the other hand the logical circuit shown in FIGURE 7 allows the use of signals the impulses of which have amplitudes of opposite polarity for example amplitudes equal to —U and +U, U being the value of the voltage of the source of D.C. current between extreme terminals and ground. In this practical example, the input signal or signals which make the transistor of the logical circuit conductive are applied to the control element of the transistor through an integrating device while the input signal or signals which make the transistor non-conductive are applied directly to the control element of this transistor.

More particularly this logical circuit utilises a D.C. source of current of which the positive and negative terminals 52 and 61 are isolated and of which the centre point is grounded.

The elements shown in FIGURE 7 having the same references as those shown in FIGURES 1 to 4 and 6 which serve the same functions and can be identical.

However this logical circuit comprises a transistor 50 of the NPN type of which the collector 51 is connected to the positive terminal 52 through a resistance 53. The base 54 of the transistor 50 is connected to the terminal 55 of a four terminal condenser 56 through a resistance 57. Each plate of this condenser has two terminals contiguous but distinct, allowing different elements of circuits to be connected to the same plate, these circuit elements being consequently at the same potential. For example, the emitter 58 of the transistor 50 is connected to the output terminal 59 of the condenser 56 situated opposite to the terminal 55.

The terminal 60 similar to the terminal 59 is connected to the middle terminal of the source connected to ground. The terminal 62 of the condenser 56, similar to the terminal 55, is connected to one side of a condenser 63 through a rectifying device or element 64, for example, a diode, the other side of the condenser 63 being connected to the collector 15 of the transistor 9. A diode 65 is inserted between the terminal 66 common to the condenser 63 and to the diode 64, and ground at 3.

The diode 64 is connected so as to be traversed by a current proceeding from the condenser 63, towards the condenser 56 and more precisely proceeding from the terminal 66 towards the terminal 62. The diode 65 is connected so as to be traversed by a current proceeding from the terminal 61 towards the terminal 66.

The base 54 of the transistor 50 is connected to the collector 26 of the transistor 20, through a resistance 67.

The collector 51 of the transistor 50 is connected to the base 42 of the transistor 41 of the output circuit amplifier, through a resistance 68.

The collectors of transistors 9–20 and 41 are connected to the negative terminal 61 of the direct current source.

In the example under consideration, the transitors 9–20 and 41 are of the PNP type and the transistor 50 is of the NPN type. Of course, the same logical circuit can be produced by replacing the transistors 9–20 and 41 with transistors of the NPN type and the transistor 50 with a transistor of the PNP type on changing over the positive and negative terminals of the direct current source and inverting the connections to the diodes 64 and 65.

Figure 8:
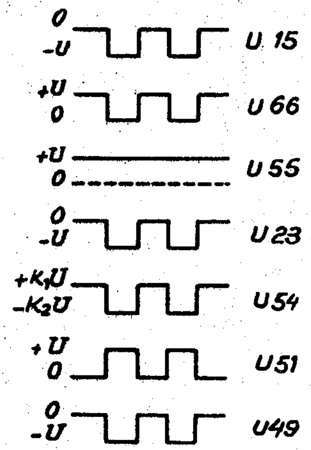
FIGURE 8 shows the relationship of the voltage curves at different points in the circuit represented in FIGURE 7.

The input signals applied respectively to the terminal 66 and to the collector 23 are respectively related to the voltage curves U66 and U23 shown in FIGURE 8.

In the example shown, the input signal U66 is obtained from an input signal U15 occurring at the collector of the transistor 9 and transmitted by the condenser 63.

The input signals U66 and U23 are, of rectangular shape, recurring, at the same frequency and having respectively, amplitudes +U and −U, U being the value of the voltage of the direct current source between terminals and ground represented by its positive and negative terminals 52, 61 and its centre terminal grounded at 3.

The input signal U55 occurring at the terminal 55 of the four terminal condenser 56, has the relationship shown in FIGURE 8, after having passed through the integrating device constituted by the diode 64, the resistance 57 and the four-terminal condenser 56. This input signal U55 is continuous and has an amplitude +U.

The signal applied to base 54 of transistor 50 issuing from the input signal U23 has nearly the same shape as U23, after passing through the resistance 67.

When the input signal U66 is applied alone to the base 54 of the transistor 50 through the integrating device, the signal transmitted by the transistor is a direct current signal.

The elements of this control circuit and the characteristics of the transistor are determined so that the transistor is in a state of saturation when the input signal has an amplitude of +U. Then, the signal transmitted by the transistor has a value of substantially zero.

When the input signal is applied alone to the base 54 of the transistor 50 through the resistance 67, no signal is transmitted by the transistor, the latter being cut off. The value of the potential occurring at the collector of the transistor 50 is substantially equal to +U, whatever the amplitude of the signal U23.

When the input signals U66 and U23 are simultaneously applied to the base 54 of the transistor 50 through their respective control circuits, the signal occurring at this base has the relationship of the curve U54 shown in FIGURE 8.

The amplitude of the signal occurring at the base 54 is equal to the algebraic sum of the amplitudes of the signals U55 and U23 respectively reduced by the voltage drops in the resistances 57 and 67 and in the emitter-base junction of the transistor 50. The amplitude of the signal occurring at the base 54 of the transistor 50 thus varies between two values, $+K_1U$ and $-K_2U$, as shown in FIGURE 8, the coefficients $K_1$ and $K_2$ taking into account, the impedance of the emitter-base junction of the transistor.

The characteristics of the transistor 50 and the elements of the control circuits, more particularly of the resistances 57 and 67 have chosen to be such that the transistor 50 is non-conductive when the amplitude of the signal U66 and U23 are in value respectively 0 and −U volts, and bottomed when the amplitudes of the signals U66 and U23 have the values respectively +U and 0 volt.

Consequently, the signal U51 occurring at the collector 51 of the transistor 50 has the relationship shown in FIGURE 8. This signal is recurring, is of rectangular shape, is of the same frequency and is displaced as to phase by 180° with respect to the input signal appearing at the collector of the transistor 20. The final output stage allows, as explained previously, a signal U49 of the same frequency and in phase with the signal U23, to be obtained.

Thus, if one designates as before by 0 and I, the two binary states at the output 49 when the output signal has a zero value corresponding to the absence of oscillations and a non-zero value corresponding to the presence of oscillations, and by 0 and I the binary states of the input signals corresponding respectively to the absence and the presence of oscillations in the corresponding control circuits, the output signal is in the state 0 if one of the two input signals is in the state 0, and in the state I if the input signals are both in the state I.

In the practical example shown and described in FIGURE 7, the logical circuit allows for the comparison of two recurring input signals of the same frequency and of opposite sign.

Likewise, in the practical example which has just been described, the logical circuit is fed from a source of direct current of which the positive and negative terminals are isolated, the centre point being grounded.

However, without going beyond the scope of the invention, a logical circuit of the same type can be produced which is fed from two separate sources of direct current, one of these sources being connected between the terminal 52 and earth, while the other source is connected between the terminal 61 and earth.

The invention is not limited to those examples shown and described, but on the contrary, covers all the embodiments and particularly as far as the shape and frequency of the input signals and the number of control circuits is concerned.

I claim:

1. A fail-safe AND gate comprising a first transistor connected across a direct current source and having an output circuit, at least two control circuits, each of which is connected to the control electrode of the first transistor by a separate resistor and each of which comprises a second transistor connected across a direct current source and having its control electrode connected to an individual source of recurrent alternating signals independent of the output of said output circuit and at least one control circuit also comprising a capacitor having one of its plates connected to the output electrode of the associated second transistor and its other plate connected to the control electrode of the first transistor through the associated resistor, and a rectifier device connected between the electrode of said second transistor connected to a reference potential and the junction between said capacitor and said resistor.

2. A gate as claimed in claim 1, wherein only one of the control circuits comprises the capacitor and rectifier device and the resistor is incorporated in integrating means connecting said other plate of the capacitor to the control electrode of the first transistor, the rectifier device being connected to the junction between the capacitor and the integrating means.

3. A gate as claimed in claim 1, wherein one of the control circuits having the capacitor and rectifier device also includes integrating means connecting said other plate of the capacitor to the control electrode of the first transistor, said resistor being incorporated in said integrating means.

4. A gate as claimed in claim 3, wherein the integrating means comprises a second rectifier device connected in series with the resistor and a second capacitor having one of its plates connected to the input electrodes of the associated second transistor and the first transistor and its other plate connected to the junction between the second rectifier device and the resistor.

5. A gate as claimed in claim 1, wherein the output circuit comprises an amplifying stage constituted by a transistor.

References Cited

UNITED STATES PATENTS

| | | | |
|---|---|---|---|
| 3,105,923 | 11/1963 | Rose et al. | 307—218 X |
| 3,213,369 | 11/1965 | McAuliffe | 328—127 X |
| 3,314,013 | 4/1967 | Dirac et al. | 328—94 X |

ARTHUR GAUSS, *Primary Examiner.*

ROBERT PLOTKIN, *Assistant Examiner.*

U.S. Cl. X.R.

328—92, 94